United States Patent Office 3,121,620
Patented Feb. 18, 1964

3,121,620
PROCESS FOR THE RECOVERY OF SULPHURIC ACID IN CONCENTRATED FORM FROM DILUTE WASTE SULPHURIC ACID LIQUORS
Hans Zirngibl, Duisburg, and Jakob Rademachers and Heribert Stütgens, Krefeld, Germany, assignors to Farbenfabriken Bayer Aktiengesellschaft, Leverkusen, Germany, a corporation of Germany
No Drawing. Filed Nov. 8, 1960, Ser. No. 67,891
Claims priority, application Germany Dec. 3, 1959
3 Claims. (Cl. 23—306)

This invention relates to a process for the recovery of sulphuric acid in concentrated form from salt-containing, particularly aluminum sulphate-containing, dilute waste sulphuric acid liquors.

Such waste acids are obtained in fairly large quantities, for example, in the digestion of titanium-containing ores or slags with concentrated sulphuric acid, after hydrolysis of the titanium sulphate solution and separation by filtration of the titanium dioxide hydrate for the production of titanium dioxide pigments. They contain about 18–25 percent of sulphuric acid and, in addition to titanium sulphate, varying quantities of iron sulphate, magnesium sulphate and aluminum sulphate, depending on the type and origin of the ore or slag.

In a heretofore known process for the recovery of concentrated sulphuric acid from dilute waste acids, the waste acid is pre-concentrated to a sulphuric acid content of 60–70 percent, whereupon the sulphates precipitate in crystalline form and are separated from the acid by filtration, and the clear concentrates, largely freed from impurities, subsequently is brought to a sulphuric acid concentration of up to 96 percent by rectification. This process is not suitable for the treatment of waste acids whose content of aluminum sulphate is more than about 0.3 percent. With waste acids having a higher content of aluminum sulphate, supersaturation of the preconcentrated acids with this salt will normally occur, so that the filtrates still contain a large portion thereof in the dissolved state. This supersaturation decreases only gradually so that upon storage solid substances in the form of acid aluminum sulphate are again formed in the initially clear filtrate. In the case of a slight excess of aluminum sulphate, they are obtained as voluminous unfilterable pulps, whilst a higher content of, for example, 2.5 percent of aluminum sulphate in a 20 percent thin acid, after preconcentration to about 65–70 percent, leads to a gelatinous solidification of the filtrate within a short time. Further concentration of such preconcentrated acids is not feasible with the means hitherto known in the art.

In accordance with another known process, these difficulties of concentrating dilute acids rich in aluminum sulphate are said to be obviated by adding to the acids, prior to concentration, monovalent alum-forming cations such as ammonium or potassium ions; the aluminum, by cooling of the solutions to about −30° C., thus crystallising out as alum, optionally together with iron and magnesium sulphate, so that after filtration an acid is formed which is almost free of salt-like impurities and can be concentrated without difficulty. However, the disadvantage of this process consists in that such cooling of the dilute acid is very expensive and that more than 1 percent of ammonium sulphate may still be dissolved in the sulphuric acid concentrated to 80 percent.

According to the process of the present invention, concentrated sulphuric acid is recovered from waste acids containing more than about 0.3 percent of aluminum sulphate and optionally also other salt-like impurities, by first preconcentrating the acids at a temperature of 140–160° C., preferably 145–152° C., depending on their aluminum sulphate content, by holding or allowing the preconcentrate including the precipitated sulphates to age at about 120–150° C. for up to about 10 hours, preferably about 2 hours, cooling to about 90–100° C. by evaporation at a subatmospheric pressure, and subsequently allowing the acid thus further concentrated once more to age at about 50–100° C., preferably about 60–70° C., for at least about 6 hours, normally about 10 hours, whereupon the precipitated salts crystallize so as to be easily filterable, and subsequently filtering and further concentrating the filtrate according to known methods.

The preconcentration of the dilute acids may expediently be carried out in immersion-heater evaporators.

The preconcentrate obtained after filtration is largely free of salt-like impurities and contains only such a small quantity of aluminum sulphate that precipitation does not occur upon storage and further concentration presents no difficulties.

The process according to the invention may be modified by carrying out the filtration in two steps if desired. When the process is thus modified, the first filtration is performed after the acid has been subjected to evaporation under vacuum or after aging for not more than two hours at about 60° C. The filter cake then contains the bulk of, for example, iron sulphate and titanium sulphate, and contains only a portion of the magnesium sulphate and aluminum sulphate that were initially present therein. The second aging of the now clear filtrate is then carried out for about 10–20 hours, preferably with the addition of seed crystals, with the result that more aluminum sulphate and magnesium sulphate grow as coarse crystals which can easily be separated from the acid. In this way a certain distribution of the salts formed is obtained.

The first seed crystals which are required for the foregoing modification of the process may be obtained, for example, by allowing the filtrate of the first filtration step to cool to room temperature whereupon it solidifies, and by subsequently heating it again to about 100° C., whereupon the bulk of the solid substances that had precipitated therein are redissolved and, upon cooling again to about 60° C., are reprecipitated, this time in a crystallized and readily filterable form. For subsequent crystallizations, the seed crystals may be withdrawn from the filter cake of the second filtration step.

Both modifications of the process are expediently carried out in a continuous manner. The process of the invention is intended in the first place for working up waste acids obtained, as stated hereinbefore, from the production of titanium dioxide pigments. However, it may also be used with advantage for the recovery of concentrated sulphuric acid from other selected dilute acids of different origin, for example, from mordant liquors containing large amount of similar impurities, particularly aluminum sulphate.

The following examples are given for the purpose of illustrating the invention.

*Example 1*

In this example, a dilute waste sulphuric acid is used that contains aluminum sulphate which was obtained from the production of titanium dioxide from titanium slag, and had the following composition:

| | Percent |
|---|---|
| $H_2SO_4$ | 22.0 |
| $TiOSO_4$ | 1.8 |
| $FeSO_4$ | 6.8 |
| $MgSO_4$ | 2.4 |
| $Al_2(SO_4)_3$ | 2.3 |
| $H_2O$ | 64.7 |

This acid is concentrated in an immersion heater evaporator at 150° C., whereupon the major portions of its titanium sulphate and iron sulphate crystallize out. The liquid portion of the suspension that is discharged from the evaporator has the following composition:

| | Percent |
|---|---|
| H₂SO₄ | 60.6 |
| TiOSO₄ | 0.3 |
| FeSO₄ | 1.0 |
| MgSO₄ | 2.4 |
| Al₂(SO₄)₃ | 5.9 |
| H₂O | 29.8 |

This suspension is passed continuously from the evaporator into a stirrer having such a volume that the acid is held therein for an average period of about 2 hours while it is maintained at a temperature of 135° C.

Subsequently the product is cooled to 90° C. by evaporation at a subatmospheric pressure and concentrated at the same time. The filtrate has the following composition:

| | Percent |
|---|---|
| H₂SO₄ | 62.5 |
| TiOSO₄ | 0.2 |
| FeSO₄ | 0.4 |
| MgSO₄ | 2.1 |
| Al₂(SO₄)₃ | 4.1 |
| H₂O | 30.7 |

The somewhat higher water content of the acid filtrate in this step, compared with that in the preliminary step, is attributable to H₂SO₄ retained in the filter cake.

After stirring the suspension at 60–70° C. for 10 hours still more salts crystallize out so that an acid is obtained which is easily filterable through a rotary filter at 60° C. and has the following composition:

| | Percent |
|---|---|
| H₂SO₄ | 65.5 |
| TiOSO₄ | 0.1 |
| FeSO₄ | 0.3 |
| MgSO₄ | 1.8 |
| Al₂(SO₄)₃ | 2.0 |
| H₂O | 30.3 |

The resulting filter cake has the following composition:

| | Percent |
|---|---|
| H₂SO₄ | 25.6 |
| TiOSO₄ | 8.0 |
| FeSO₄ | 30.0 |
| MgSO₄ | 9.6 |
| Al₂(SO₄)₃ | 8.7 |
| H₂O | 18.1 |

The filtered acid is suitable for further concentration up to 90 percent.

*Example 2*

A dilute acid of the following composition:

| | Percent |
|---|---|
| H₂SO₄ | 24.0 |
| TiOSO₄ | 1.5 |
| FeSO₄ | 6.0 |
| MgSO₄ | 2.7 |
| Al₂(SO₄)₃ | 2.7 |
| H₂O | 63.1 | is concentrated in an evaporator at 145° C., aged with stirring at 135° C. for 2 hours further concentrated by evaporation and cooled under vacuum and, finally, kept at 60° C., while stirring for up to 2 hours and filtered. The compositions of the clear solutions after the individual consecutive steps are included in the following table:

| | After concentr. in the evaporator at 145° C. | After 2 hrs. at 135° C. | After vacuum cooling 90° C. | After 2 hrs. at 60° C. |
|---|---|---|---|---|
| Percent H₂SO₄ | 57.5 | 59.4 | 63.7 | 64.0 |
| Percent TiOSO₄ | 0.29 | 0.18 | 0.18 | 0.16 |
| Percent FeSO₄ | 1.73 | 0.82 | 0.82 | 0.58 |
| Percent MgSO₄ | 3.68 | 2.92 | 2.88 | 2.84 |
| Percent Al₂(SO₄)₃ | 6.10 | 6.15 | 6.58 | 6.60 |
| Percent H₂O | 30.70 | 30.53 | 25.86 | 25.82 |

The resulting filter cake had the following composition:

| | Percent |
|---|---|
| H₂SO₄ | 21.4 |
| TiOSO₄ | 8.9 |
| FeSO₄ | 41.0 |
| MgSO₄ | 13.6 |
| Al₂(SO₄)₃ | 4.4 |
| H₂O | 10.7 |

From the rotary filter the filtered acid passes into a container where it is held at 50–60° C. with the addition of 0.2 percent of seed crystals for 18 hours. The seed crystals were obtained from an acid which had solidified at room temperature after several days to form a gelatinous thixotropic mass, by heating the mass to 100° C. and cooling immediately to 60° C., whereupon readily filterable crystals are obtained which can be used for seeding the first filtrate. The supersaturation with aluminum sulphate is thereby reduced to such an extent that, after filtering off the solid substances at 60° C., a stable acid is obtained which can be further concentrated. Its composition is as follows:

| | Percent |
|---|---|
| H₂SO₄ | 70.6 |
| TiOSO₄ | 0.02 |
| FeSO₄ | 0.24 |
| MgSO₄ | 1.85 |
| Al₂(SO₄)₃ | 1.60 |
| H₂O | 25.69 |

The resulting filter cake which is readily filterable and can be used with good results for seeding subsequent crystallizations has the following composition:

| | Percent |
|---|---|
| H₂SO₄ | 46.3 |
| TiOSO₄ | 0.5 |
| FeSO₄ | 1.6 |
| MgSO₄ | 5.7 |
| Al₂(SO₄)₃ | 21.7 |
| H₂O | 24.2 |

We claim:
1. A process for the recovery of sulphuric acid from a dilute waste sulphuric acid contining titanium sulphate and more than about 0.3 percent by weight of aluminum sulphate together with sulphates of other polyvalent metals that was recovered in a process for the production of titanium dioxide by hydrolysis of a titanium sulphate solution produced by digestion of a titanium-containing material of the group consisting of commercial titanium ores and slags with sulphuric acid and separation of the precipitated hydrated titanium dioxide therefrom, to obtain a residual solution of sulphuric acid that is amenable to further concentration, which consists of the following steps

(a) preliminarily concentrating the said waste acid at a temperature between about 140 and about 160° C. to a concentration between about 55 and about 65 percent by weight of sulphuric acid, dependent upon its content of aluminum sulphate, (b) aging the resulting concentrate and salts precipitated therein at a temperature between about 120 and about 150° C. for a period between about 2 and about 10 hours, (c) subjecting the resulting aged concentrate to evaporation at a subatmospheric pressure and continuing the evaporation until the temperature of the concentrate is between about 90 and about 100° C., (d) thereafter aging the concentrate at a temperature between about 50 and about 100° C. for a second period of at least about 6 hours, and subsequently (e) separating the precipitated solids from the concentrate containing sulphuric acid and less than about 0.3 percent by weight of aluminum sulphate.

2. A process as defined in claim 1 in which the precipitated salts produced during the preliminary concentration of the acid and subsequent aging and vacuum evaporation (step c) are separated by filtration, seed crystals are then added and the concentrate is aged at a temperature between about 50 and about 100° C. for a second period not less than 10 hours, and subsequently separating a second crop of precipitated solids and recovering the filtrate containing sulphuric acid.

3. A process for the treatment of a waste sulphuric acid liquor containing sulphates of aluminum, iron, and magnesium, that was recovered in a process for the production of titanium dioxide by hydrolysis of a titanium sulphate solution produced by digestion of a titanium-containing material of the group consisting of commercial titanium ores and slags with sulphuric acid and separation of the precipitated hydrated titanium dioxide there from, to obtain a concentrated sulphuric acid solution that is substantially free of iron and magnesium salts and contains less than about 0.3 percent aluminum sulphate, which consists of the following steps (a) preliminarily concentrating the said waste acid at a temperature between about 145 and about 152° C. to a concentration between about 55 and about 65 percent by weight of sulphuric acid, (b) aging the resulting concentrate and precipitated salts at a temperature between about 120 and about 150° C. for a period between about 2 and about 10 hours, (c) subjecting the resulting aged concentrate to evaporation at a subatmospheric pressure and continuing the evaporation until the temperature of the concentrate is between about 90 and about 100° C., and (d) thereafter aging the concentrate at a temperature between about 60 and about 70° C. for a second period of at least about 10 hours, (e) subsequently separating the precipitated solids by filtration, and (f) recovering the filtrate containing concentrated sulphuric acid.

References Cited in the file of this patent

UNITED STATES PATENTS

| | | |
|---|---|---|
| 2,078,088 | Mantius et al. | Apr. 20, 1937 |
| 2,864,670 | Walwark | Dec. 16, 1958 |
| 2,895,813 | Brooksbank et al. | July 21, 1959 |